Oct. 25, 1966 G. VOLD 3,280,644
CONTROL SYSTEM FOR ANGULAR MOMENTUM STORAGE FRAME
Filed Oct. 4, 1961 3 Sheets-Sheet 1

INVENTOR.
GUNNAR VOLD
BY Herbert L. Davis
ATTORNEY

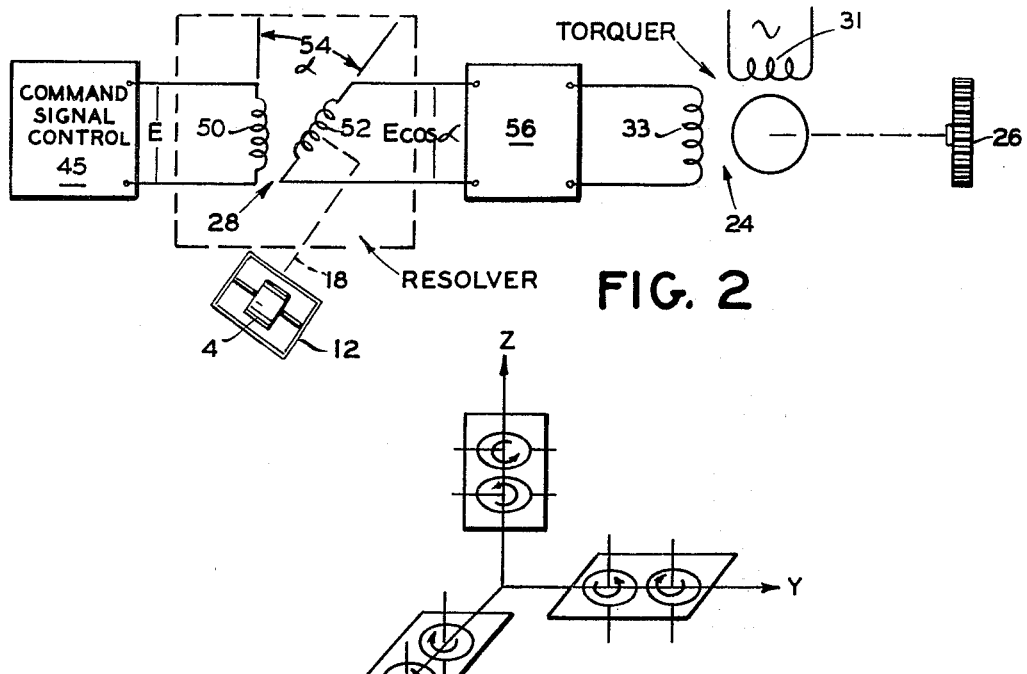
FIG. 2
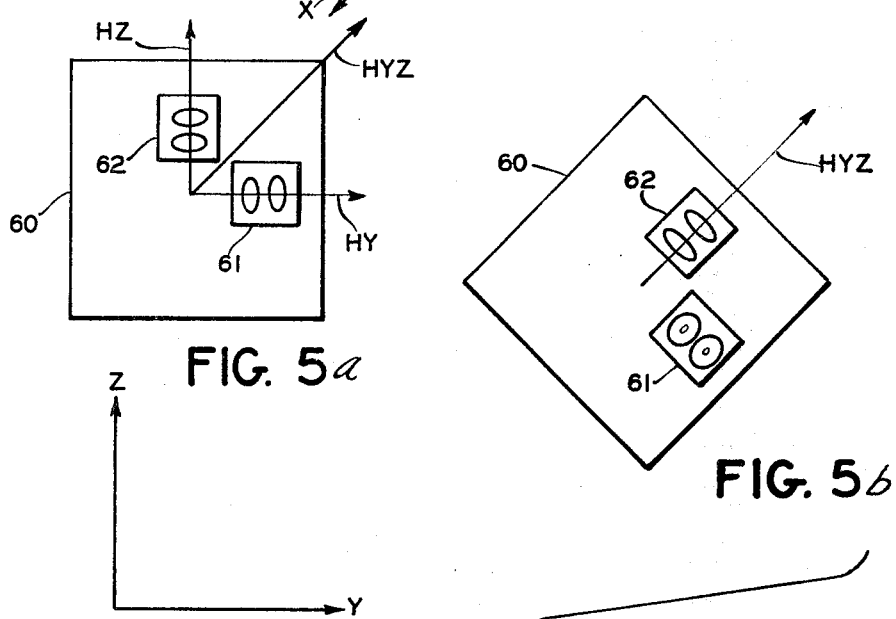
FIG. 3
FIG. 5a
FIG. 5b
FIG. 5
INVENTOR.
GUNNAR VOLD
BY Herbert L. Davis
ATTORNEY United States Patent Office 3,280,644
Patented Oct. 25, 1966

3,280,644
CONTROL SYSTEM FOR ANGULAR MOMENTUM STORAGE FRAME
Gunnar Vold, Mahwah, N.J., assignor to The Bendix Corporation, Teterboro, N.J., a corporation of Delaware
Filed Oct. 4, 1961, Ser. No. 142,815
9 Claims. (Cl. 74—5.34)

The invention relates in general to means for positioning a craft in space and more particularly to an angular momentum storage frame carrying cooperating gyroscopes and including means for applying a torque to the gyroscopes to control the relative position of the frame in response to a command signal, together with means for varying the magnitude of the command signal in accordance with the angular position of the gyroscopes in the frame.

An angular momentum storage frame comprises two rotors having identical inertia rotating in opposite directions, and each mounted in a gimbal. The gimbals are rotatably mounted in a frame along their gimbal axes and are geared together so that rotation of one gimbal in one sense causes the other to rotate in the opposite sense. Torque applied to the gimbals will cause the frame to rotate about an axis in quadrature with the spin axis of the rotors and the gimbal axes and in a sense according to the direction of the applied torque. Simultaneously, application of an external torque about the frame axis does not produce rotation of the frame about its axis but will cause the gimbals to precess.

The rate of rotation of a frame about its axis is a function of both the torque applied to the gimbals and the amount of gimbal precession from a so called null position. Heretofore, difficulty was encountered when an attempt was made to rotate a body in space by means of an angular momentum storage frame at a constant or predetermined rate of rotation; and difficulty was also encountered in rotating a body controlled by the angular momentum storage frame a predetermined amount of rotation because an external control system which measured the amount of rotation was required. Such external control systems are inaccurate and complicated.

The present invention is a simple circuit for rotating a body in space by means of angular momentum storage frames at a constant angular velocity and for rotating the body a predetermined amount without external rotation measuring devices. Thus, with the present control system, a body in space may be stabilized and rotated with the aid of several angular momentum storage frames at any point in its flight regime and in accordance with a predetermined programmed set of flight instructions and in the absence of rotation sensing and feedback systems.

An object of the invention is to provide a novel means for rotating and stabilizing a body in space about any one of a set of coordinated axes, in response to command signals.

Another object of the invention is to provide a novel and accurate means for controlling the rotation of a body in space.

Another object of the invention is to provide a novel control means for rotating an angular momentum storage frame at a constant rate of rotation.

Another object of the invention is to provide a novel control means for rotating an angular momentum storage frame at a predetermined rate of rotation.

Another object of the invention is to provide a novel control means for rotating a body in space and adapted to be used with a predetermined programmed flight regime.

Another object of the invention is in the provision of a resolver and a torquer on an angular momentum storage frame, to produce a controlled positioning of the frame.

Another object of the invention is to mount several angular momentum storage frames each including the novel control means on a body in space to effect rotation of the body.

Another object of the invention is to provide a simplified means of rotating a torqued angular momentum storage frame in space by interpositioning a resolver between the command signal input to the torquer and the torquer.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Referring to the drawings:

FIGURE 2 is a schematic diagram of the novel control system for the single axis angular momentum storage frame shown in FIGURE 1.

FIGURE 3 shows a three dimensional angular momentum storage frame.

FIGURE 5 is a functional diagram showing an exchange of angular momentum between a Y device and a Z device embodying the invention.

Figure 1:
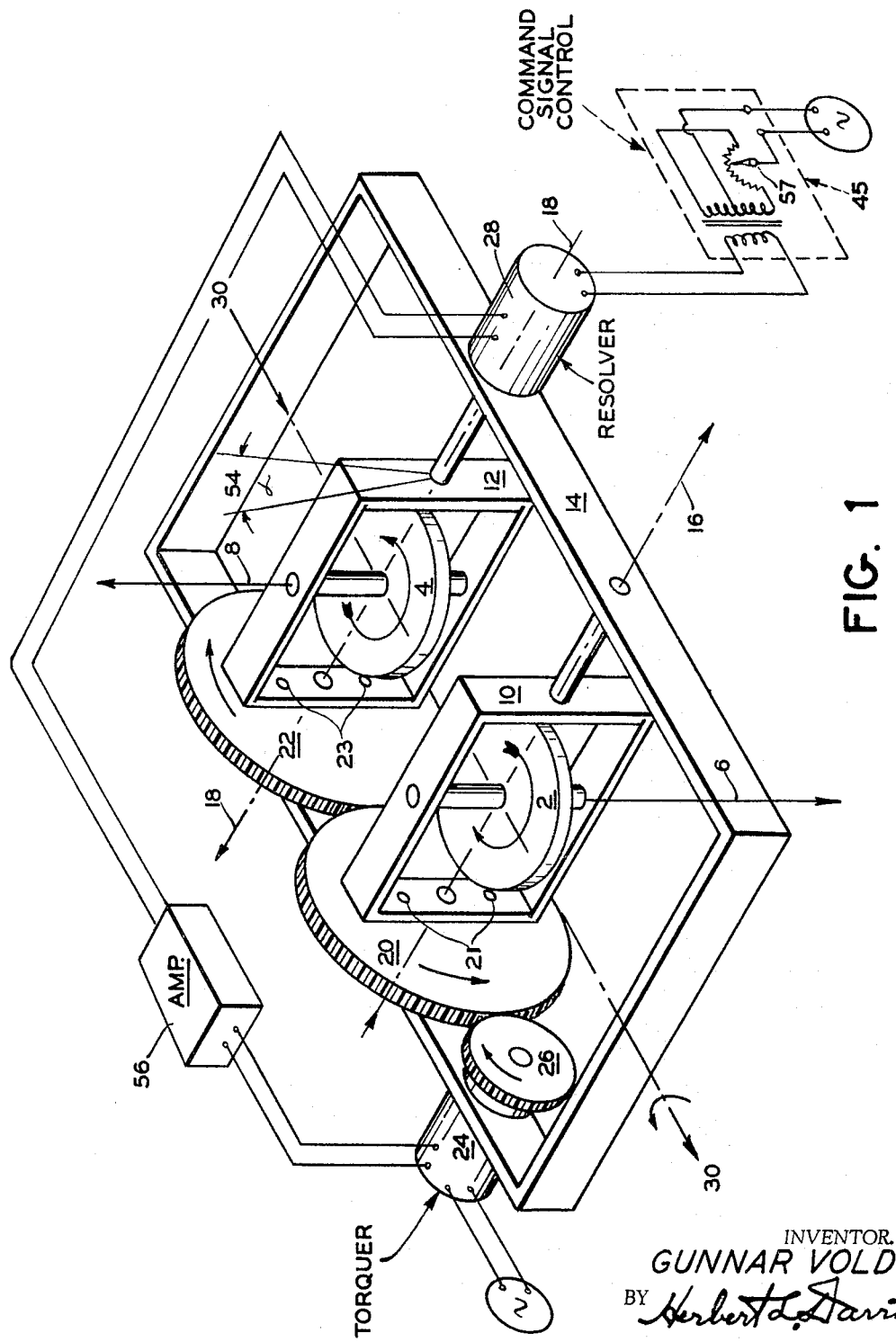
FIGURE 1 shows the invention as applied to a single axis angular momentum storage frame with torquer and resolver.

A single axis angular momentum storage frame is shown in FIGURE 1 and consists of two synchronous rotors 2 and 4 of identical inertias and driven by suitable motor means of conventional type, not shown, so as to rotate at identical speeds, but in opposite senses. Each rotor 2 and 4 has a spin axis or spin vector 6 and 8 respectively. In an initial or null position, the spin axes 6 and 8 are parallel, but in opposite senses.

Each rotor 2 and 4 is mounted in a gimbal 10 and 12. The gimbals 10 and 12 are rotatably mounted in a frame 14 about gimbal axes 16 and 18 respectively which are parallel to each other, and at right angles to each null position spin axis. Each rotor and gimbal may be considered as a single degree of freedom gyroscope.

A gear 20 is rigidly secured as by bolts 21 to gimbal 10 with its axis coaxial with the gimbal axis 16. Another gear 22, identical to gear 20, is rigidly secured as by bolts 23 to gimbal 12 with the gear axis coaxial with the gimbal axis 18. The two gimbals 10 and 12 and the gears 20 and 22 are rotatably mounted in a frame 14 with the gears adjacent to each other and the teeth of said gears in engaged relation. Thus, the two gimbals 10 and 12 are linked to each other in a one to one ratio.

Also mounted on the frame 14 is a torquer 24 which may be a two phase reversible motor of conventional type whose output gear 26 engages gear 20 attached to gimbal 10. Also, with regard to FIGURE 1, we define a gimbal angle α shown in the FIGURE as the rotation of the gimbals 10 and 12 about the gimbal axis from the null position. An angle resolver 28 which may be a variable induction transformer of conventional type is arranged to measure the gimbal angle α. Finally, we define a frame axis 30 as the axis in quadrature with the null position spin axis and the gimbal axis.

The two rotors 2 and 4 are spinning in opposite directions at synchronous speeds, and the gears 20 and 22 are so engaged that rotation of the gimbal 10 about its gimbal axis 16 in one sense produces a rotation of the other gimbal 12 about its gimbal axis 18 in the opposite sense.

Thus, for all values of the gimbal angle α, the angular momentum of the two rotors 2 and 4 along the null spin axis is always equal in magnitude and opposite in direction, i.e. the net angular momentum along the null spin axis is always equal to zero. However, the net angular momentum along the frame axis 30 is equal to the sum of the components of angular momentum of the individual rotors 2 and 4 along the frame axis 30, and is a function of the gimbal angle α. If the angular momentum of each rotor is ½H, then the net angular momentum along the frame axis 30 equals—

$$H_{frame} = H \sin \alpha$$

This relation is basic in the angular momentum storage frame.

The single axis angular momentum storage frame performs two functions. Each function is performed completely independently of the other and both can be performed simultaneously. It will greatly facilitate understanding the angular momentum storage frame if the distinction between the two functions is always kept in mind. The two functions are: (1) the frame 14 does not rotate in response to an external torque (impulse) applied to it about the frame axis 30, but stores the impulse of the external disturbance within the frame as angular momentum by precession of the gimbals 10 and 12 about gimbal axes 16 and 18; (2) the frame 14 rotates about the frame axis 30 only when a torque is applied on the gimbals 10 and 12 by the torquer 24 and in a direction dependent upon the direction of the torque applied by the torquer or reversible motor 24.

Considering the first function: when an external torque is applied about the frame axis 30, the frame 14 does not rotate, but the two gimbals 10 and 12 precess about the gimbal axis 16 and 18 respectively. The precession is governed by the law of gyroscopic precession; viz: when an external torque is applied, the spin vector tries to move into alignment with the applied torque vector giving rise to precession about an axis in quadrature to both the spin and torque vectors.

The relation between the applied external torque and the rate of precession is such that $$T = H \frac{d \sin \alpha}{dt}$$

which is equal to $$T = H \cos \alpha \frac{d\alpha}{dt}$$

where:

$T$ = the external torque,
$H$ = total angular momentum of the two rotors,
$\alpha$ = the gimbal angle, and
$\frac{d\alpha}{dt}$ = the rate of precession of the gimbals.

While the external torque is applied about the frame axis 30, the gimbals 10 and 12 precess about their axes so that the spin axes 6 and 8 approach alignment with the frame axis 30, and the frame 14 does not rotate about its axis 30. Thus, the frame 14 is stable in space with respect to external disturbances.

The foregoing should be qualified in so far as the frame may become saturated which may occur when the total external impulse is equal to and exceeds the angular momentum of the two rotors 2 and 4. Upon saturation, the frame 14 can no longer resist the external torque and will rotate freely in response thereto. As it is desirable to keep the frame rigid in space, the angular momentum frame is designed to have sufficient angular momentum in its rotors to absorb all external forces that may be applied during the flight regime, or an unloading device may be incorporated in the frame. One type of unloading device may consist of a switch which is actuated on the gimbal angle exceeding a predetermined value, (let us say 60°). The switch triggers a rocket device, on the space craft in which the frame is mounted to exert an external impulse about the frame axis and in the proper sense. Other unloading schemes will be apparent to those skilled in the art.

Thus, the unsaturated frame will not rotate in space about its axis when subjected to external torques. The only way the frame can rotate in space is in response to torque applied about the gimbal axes 16 and 18, and this is exactly how the frame 14 is rotated.

In particular, torque from the torquer 14 applied at gear 26 causes gear 20 to rotate in one sense and gear 22 to rotate in the opposite sense.

The torquer 24 may be of any convenient or conventional type and, as shown schematically in FIGURE 2, may be a reversible two-phase type of motor designed to produce a torque output at gear 26 directly proportional to an electrical A.C. signal applied to its input. The motor 24 has a fixed phase winding 31 connected across a suitable source of A.C. current and a variable phase control winding 33 to which is applied a suitable A.C. control signal.

For purpose of illustration, let us assume that the A.C. control signal is of a phase such as to cause the torquer 24 to apply a torque to the output gear 26 in clockwise direction (see arrows in FIGURE 1) so as to produce a counterclockwise torque on gear 20, and a clockwise torque on gear 22. Rotors 2 and 4 are spinning in the directions indicated by the arrows shown thereon in FIGURE 1. Rotor 2 has a null component of its spinning vector 6 pointing downward as indicated by the direction of the arrow on line 6 (in FIGURE 1, the rotors 2 and 4, and the spin vectors 6 and 8 are in the null position) and the torque applied to gimbal 10 produces a torque vector pointing in the direction of the arrow along the gimbal axis 16. Therefore, the precession vector is pointing in the direction of the arrow along the frame axis 30 so that the frame 14 rotates counterclockwise around the frame axis 30. Likewise, rotor 4 has its null component of spin vector 8 pointing upwards, as indicated by the direction of the arrow on line 8, and the torque vector pointing in the direction of the arrow along gimbal axis 18. Thus, the precision vector is pointing in the direction of the arrow along the frame axis 30 and in the same direction as the precession vector of the gyroscope containing rotor 2 so as to produce in cooperation therewith a counterclockwise rotation of the frame 14 about its axis 30. Likewise, if the torque from the torquer 24, in the example, is counterclockwise, the frame rotates clockwise.

The rate of rotation of the frame 14 about frame axis 30 is a function of the torque applied by the torquer 24 and the gimbal angle α, expressed in mathematical terms—

$$\omega_{frame} = \frac{T}{H \cos \alpha}$$

where:

$\omega_{frame}$ = the rate of rotation (precession) of the frame about the frame axis,
$T$ = the torque applied to the gimbal, and
$H \cos \alpha$ = the component of angular momentum along the null position spin axis.

It is desired to produce a constant rate of rotation of the frame about its axis for a given command signal. Difficulty is encountered because the angle α, shown in FIGURE 1, and indicated by the numeral 54, is a nonpredictable variable, which changes with the precession of the gimbals 10 and 12 whenever the frame 14 absrobs external impulses. To produce a controllable rotation of the frame 14 about its axis 30 regardless of the gimbal angle α and changes of the gimbal angle α, a command signal of variable phase and amplitude may be applied by command signal control 45, shown schematically in the FIGURE 1 to the torquer 24 through resolver 28.

The resolver 28 may be a variable induction device 28, which, as shown in FIGURE 2, may include a stator winding 50 and a rotor winding 52. An A.C. command signal voltage E of a phase and magnitude selected by operation of the control 45 is applied to the stator winding 50 and the electrical A.C. signal output at the rotor winding 52 is equal to the applied stator A.C. signal voltage times the cosine of the rotor angle 54 ($E \cos \alpha$), so that the signal applied through an amplifier 56 of conventional type to the control winding 33 of the torquer 24 will at all times be proportional to the command signal supplied by the device 45, multiplied by the cosine of the rotor angle 54.

The resolver 28 is mounted on the frame 14 with the stator winding 50 rigidly attached to the frame 14, and with the rotor winding 52 coaxial with the axis 18 of the gimbal 12 and rigidly attached to the gimbal 12 so that the rotor rotates in accordance with the rotation of the gimbal 12. Thus, the rotor angle 54 is equal to the gimbal angle α upon rotation of the gimbal 12 from the initial null position of FIGURE 1.

The voltage command signal applied by the device 45 to the stator winding 50 of the resolver 28 is proportional to the command signal produced by manual or automatic control of an adjustable potentiometer 57 of the command signal control 45. The output of the resolver 28 (an electrical signal available at the rotor winding 52) is equal in magnitude to ($E \cos \alpha$) and is applied through the amplifier 56 as a control signal to the control winding 33 of the torquer 24. Since the torquer 24 is of a constant torque type whose output is directly proportional to the electrical signal applied thereto, the torque output T is proportional to the strength of the command signal supplied by the device 45 times the cosine of the gimbal angle α

$$T = E \cos \alpha$$

It can thus be seen that the rate of rotation of the frame 14 about its axis 30 is the same for a given command signal E regardless of the gimbal angle. When shown mathematically by combining the above two equations, we get $$\omega_{frame} = \frac{E \cos \alpha}{H \cos \alpha} = \frac{E}{H}$$

and $\omega_{frame}$, the rate of rotation of the frame 14, is proportional to the command signal regardless of the gimbal angle.

A three dimensional angular momentum storage frame 14 is shown in FIGURE 3 and comprises three single axis angular momentum storage frames wherein the frame axis of each frame is located along a different coordinate axis of a Cartesian coordinate system. The frame axis may be aligned in other configurations but each frame axis must be at least partially independent of each other.

The purpose of a three dimension angular momentum storage frame is that when mounted in a vehicle for travel in outer space, it prevents rotation of the vehicle due to external disturbances and is a means to accurately rotate the vehicle in accordance with command signals.

Figure 4:
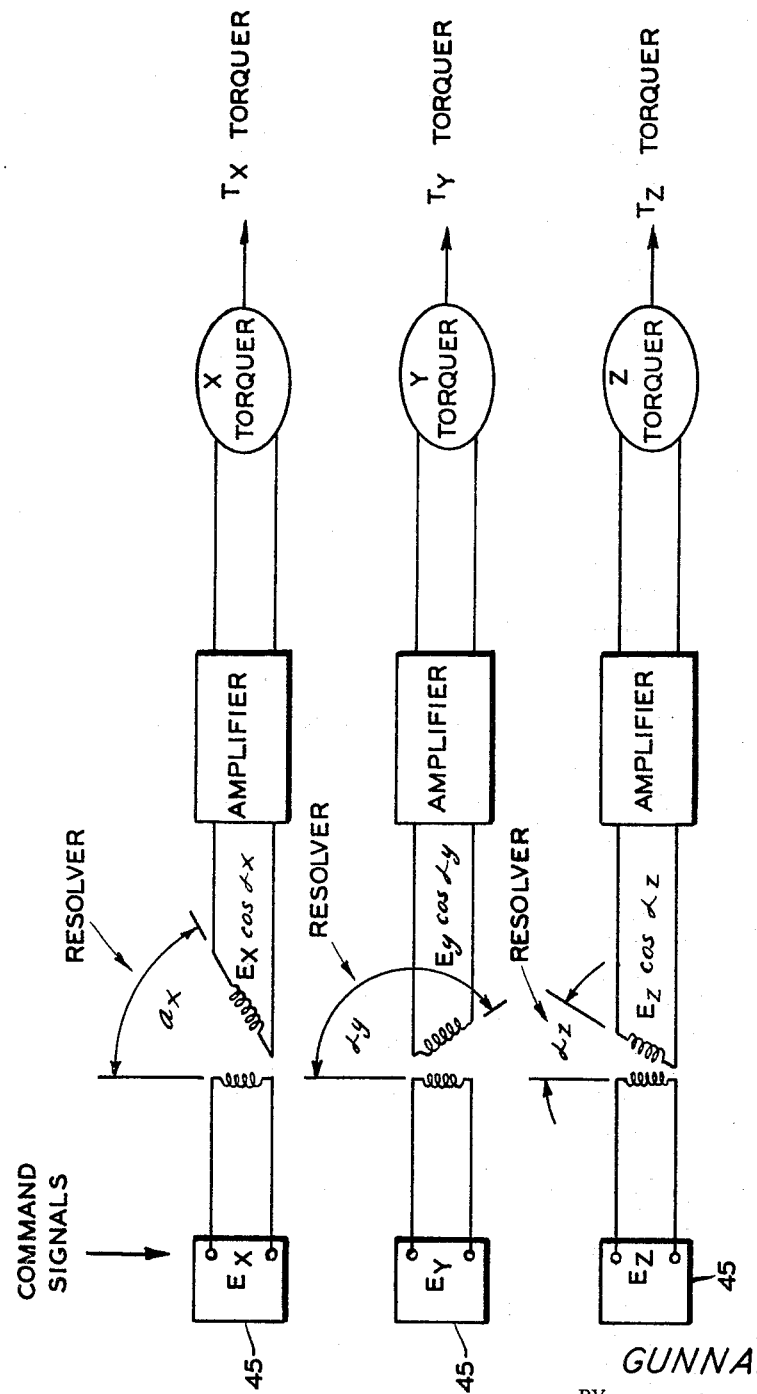
FIGURE 4 is a functional block diagram of three axis angular momentum storage frame showing the operation of the novel control system.

The operation of the three dimension angular momentum storage frame is the same for each component as it is in the single axis angular momentum storage frame. Each single axis angular momentum storage frame is equipped with a resolver 28 and a torquer 24. The command signals are fed into the appropriate resolver 28 for controlled rotation of the craft about the particular coordinate axis as is shown in FIGURE 4, which is a functional block diagram of a three axis angular momentum storage frame pointing up the operation of the resolvers.

A further feature of the three dimension system relates to the exchange of angular momentum between one storage frame and another, and is illustrated schematically in FIGURE 5. For simplicity, the frame whose axis points in the X direction has been designated an X device, the frame whose axis points in the Y direction has been designated a Y device and the frame whose axis points in the Z direction has been designated a Z device.

There is shown schematically in FIGURE 5a, the YZ plane of three dimensional device with fixed coordinate axes Y and Z, and containing a space vehicle 60 on which is mounted a three axis angular momentum storage frame, and on which the Y and Z devices 61 and 62 respectively are shown. Let us assume that the Y device and the Z device each have an amount of stored angular momentum shown vectorially as HY and HZ. (In other words, the gimbal angle of the Y device and the Z device are other than zero or null position), and the net stored angular momentum in the YZ plane is then shown by the vector HYZ.

As the body 60 is rotated about the X axis to a new position as shown in FIGURE 5b, the HYZ vector remains fixed in space due to preservation of angular momentum. But now the Z device 62 is in line with the vector HYZ and all of the angular momentum HYZ is contained in the Z device 62. As the body rotates further, it is seen that the Z device 62 and the Y device 61 exchange the stored angular momentum shown by HYZ vector. During each complete revolution of the frame 60 about the X axis, the Y device 61 and the Z device 62 will contain all the stored angular momentum at two different points during rotation.

The exchange of angular momentum between the Y device 61 and Z device 62 detailed above can be explained with regard to gyro precession. Prior to rotation of the frame about the X axis, the angular momentum shown by vectors HY and HZ were contained in the Y device 61 and the Z device 62 respectively. As the rigid body rotates, the Y device 61 needs a torque about the Z axis which it gets from the Z device 62 while the Z device 62 goes through a gimbal precession. Simultaneously, the Z device 62 needs a torque about the Y axis which it gets from the Y device 61 while the Y device 61 also goes through a gimbal precession.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an apparatus for positioning a craft in space including a pair of associated rotors each mounted in a gimbal, said rotors being rotated in opposite directions with identical inertia, said gimbals being rotatably mounted in the craft, and means operable to rotate the gimbals equally in opposite directions; the improvement comprising a control means operative in accordance with a command signal for applying torques to said gimbals to position said craft, including means for controlling the magnitude of the command signal in accordance with the rotation of the gimbals, torquing means operatively engaged to the means operable to rotate the gimbals, and conducting means for conducting a magnitude controlled command signal to the torquer for regulating the torque output thereof.

2. In an apparatus for rotating a craft in space which includes a pair of associated rotors each mounted in a gimbal, said gimbals are separately operable thereon to rotate in the craft, said rotors rotated in opposite directions and at equal speeds and means to displace the gimbals equally in opposite directions; the improvement comprising a control means operative in accordance with a command signal for applying torques to said gimbals and thus rotating said craft, including means for controlling the magnitude of the command signal in accordance with the displacement of the gimbals, torquing means operatively engaged to the means to displace the gimbals, and means for conducting the magnitude controlled command signal to the torquing means for regulating the torque output thereof.

3. An angular momentum storage frame to provide rotation of a frame about its axis in response to a signal comprising two gyroscopes each including a rotor having a spin axis and a gimbal having a gimbal axis, two gears one each coaxial with a gimbal axis and rigidly attached to a gimbal, a frame on which said gyroscopes are rotatably mounted along their gimbal axes with the gears directly engaged and with the spin axis of the rotors directed in opposite senses, torquing means for applying torque to said gears in accordance with the signal, control means for controlling the amount of signal applied to said torquing means.

4. An angular momentum storage frame to provide controlled rotation of a frame about its axis in response to a command signal comprising two rotors each having spin axes, two gimbals one for each of said rotors and each having a gimbal axis, said rotors being rotated in opposite directions and at equal speeds, means to displace the gimbals about their axes equally in opposite directions, torquing means for applying torque to said means to displace the gimbals in accordance with a received signal, means for controlling the amount of command signal applied to said torquing means according to the position of the gimbals about the gimbal axes thereof.

5. An angular momentum storage frame comprising two synchronous rotors spinning in opposite directions and of identical inertia and being alignable in a null spin axis position with the spin axes parallel to each other; two gimbal rings having gimbal axes parallel to each other and each perpendicular to the null position spin axes, and with each of said gimbals having mounted therein one of the synchronous rotors; two gears, one each mounted on a gimbal coaxial with the gimbal axis; a frame having a frame axis in quadrature with the null spin axis and the gimbal axis, and having the gimbals and gears mounted therein with the gears engaged and with the gimbals rotatable in opposite directions, so that said frame upon the application of an impulse about the frame axis will remain fixed in space and the gimbals precessing about their axes; a torquer mounted on said frame and having an output operatively engaging one of the gears, said torquer producing a torque proportional to an input signal, a command signal for rotating said frame about its axis, a control means for controlling the magnitude of the command signal applied as an input signal to the torquer and in accordance with the precession of the gimbals so that the frame rotates about its axis at a constant rate of rotation for a given command signal, and transmitting means for transmitting the magnitude control command signal from the control means to said torquer.

6. An angular momentum storage frame for stabilization and command rotation of a body comprising a first spinning wheel, a first shaft rigidly attached to and passing through the axis of said first spinning wheel, a first gimbal ring within which the first shaft is rotatably mounted and having a gimbal axis perpendicular to the first shaft, a first gear rigidly attached to the first gimbal ring, said first gear having an axis coaxial with the axis of the first gimbal ring, a second spinning wheel, a second shaft rigidly attached to and passing through the axis of the second spinning wheel, a second gimbal ring within which the second shaft is rotatably mounted, and having a gimbal axis perpendicular to the second shaft, a second gear identical with the first gear and rigidly attached to the second gimbal ring, said second gear having an axis coaxial with the axis of the second gimbal ring, a frame having pivotably mounted therein on said gimbal axes the first and second rings, the first and second gears being operatively engaged one with the other in a one to one ratio, a torquer mounted on said frame having an input and an output, said output being operatively engaged with one of said gears for applying a torque to said gears in opposite senses, said input adapted to receive an electrical signal and said torquer being adapted to apply torque to said gears proportional to the electrical signal applied at the input thereof, a resolver mounted on the frame having a rotor winding and a stator winding, said rotor winding being inductively coupled to the stator winding and positioned in accordance with the rotation of a gimbal ring about its gimbal axis, means for applying an electrical command signal to one of said windings of the resolver and conducting means for applying an electrical signal induced in the other of said windings of the resolver to the input of the torquer.

7. In an apparatus for positioning a craft in space including a plurality of pairs of associated rotors with each rotor mounted in a gimbal, said rotors of each pair being rotated in opposite directions with identical inertia, said gimbals being rotatably mounted in the craft, and means operable to rotate the gimbals of each pair of rotors in opposite directions; the improvement comprising a control means operative in accordance with command signals for applying torques to said gimbals to position said craft, including means for controlling the magnitude of the command signal in accordance with the rotation of the gimbals, torquing means operatively engaged to the means operable to rotate the gimbals, and conducting means for conducting magnitude controlled command signals to the torquing means for regulating the torque output thereof.

8. An angular momentum storage frame to provide rotation of a frame about a plurality of axes in response to signals comprising a plurality of pairs of gyroscopes, one pair of gyroscopes for each of the axes, and each gyroscope including a rotor having a spin axis and a gimbal having a gimbal axis; a plurality of gears one each coaxial with each gimbal axis and rigidly attached to said gimbal, a frame on which said gyroscopes are rotatably mounted in pairs along their gimbal axes with the gears of each pair of gyroscopes directly engaged and with the spin axis of the rotors directed in opposite senses, a plurality of torquing means for applying torque to each pair of gears in accordance with signals control means for controlling the amount of signal applied to a torquing means.

9. A plurality of single degree of freedom angular momentum storage frames for stabilization and command rotation of a body in space in response to electrical command signals, comprising in combination: a plurality of frames, each of said frames including a pair of assemblies; each assembly of the pair including a spinning wheel having an axis, a shaft rigidly attached to and coaxial with the axis of the spinning wheel, a gimbal ring having the shaft rotatably mounted therein and a gimbal axis perpendicular to the shaft, gearing means for rotating said gimbal ring about its axis; the pair of assemblies corresponding to each frame being pivotally mounted on the respective gimbal axes thereof within the corresponding frame and so mounted that the two gearing means of each pair of assemblies engage each other so that rotation about the axis of one gimbal ring in one direction causes the other gimbal ring of the pair to rotate in the opposite direction; a plurality of torquers, one of said torquers being mounted on each frame corresponding to said pair of assemblies, each torquer having an input and an output, each of said torquers being adapted to provide a torque proportional to an electrical signal applied at the input thereof, and the output of each torquer being operatively engaged with the gearing means mounted on the frame corresponding thereto for applying a torque to said corresponding frame; a plurality of resolvers, one of said resolvers being carried by each frame, each resolver having a first winding and a second winding, one of said windings being positioned in accordance with the rotation of one of the gimbal rings about the axis thereof within the corresponding frame, and the other of said windings being fixed with respect to said corresponding frame; and a plurality of means for applying separate electrical command signals to each of the first windings of the resolvers; and a plurality of conducting means connecting the second winding of each resolver carried by said corresponding frame with the input of the torquer engaged with the gearing means mounted on said corresponding frame.

References Cited by the Examiner

UNITED STATES PATENTS

| | | | |
|---|---|---|---|
| 1,232,619 | 7/1917 | Sperry | 74—5.34 X |
| 1,999,897 | 4/1935 | Fieux | 74—5.37 X |
| 2,845,800 | 8/1958 | Holmes | 74—5.34 |

FOREIGN PATENTS

| | | |
|---|---|---|
| 646,425 | 6/1937 | Germany. |

FRED C. MATTERN, JR., *Primary Examiner.*

BROUGHTON G. DURHAM, MILTON KAUFMAN, *Examiners.*

T. W. SHEAR, P. W. SULLIVAN, *Assistant Examiners.*